US012584827B2

(12) United States Patent
Chen et al.

(10) Patent No.: US 12,584,827 B2
(45) Date of Patent: Mar. 24, 2026

(54) FULL-AUTOMATIC PREPARATION METHOD OF CAST-OFF CELL SMEAR

(71) Applicant: JIAXING JINGZHU BIOTECHNOLOGY CO., LTD., Jiaxing (CN)

(72) Inventors: Shilei Chen, Jiaxing (CN); Bin Zeng, Jiaxing (CN); Longfei Lu, Jiaxing (CN); Haigui Zhu, Jiaxing (CN); Yuqing Wang, Jiaxing (CN); Lei Nie, Jiaxing (CN); Fuyu Hu, Jiaxing (CN); Kuoye Wang, Jiaxing (CN); Yiming Li, Jiaxing (CN)

(73) Assignee: JIAXING JINGZHU BIOTECHNOLOGY CO., LTD., Jiaxing (CN)

( * ) Notice: Subject to any disclaimer, the term of this patent is extended or adjusted under 35 U.S.C. 154(b) by 488 days.

(21) Appl. No.: 18/029,674

(22) PCT Filed: Apr. 22, 2021

(86) PCT No.: PCT/CN2021/088915
§ 371 (c)(1),
(2) Date: Mar. 31, 2023

(87) PCT Pub. No.: WO2022/073335
PCT Pub. Date: Apr. 14, 2022

(65) Prior Publication Data
US 2023/0366790 A1 Nov. 16, 2023

(30) Foreign Application Priority Data
Oct. 9, 2020 (CN) ......................... 202011074112.3

(51) Int. Cl.
*G01N 1/00* (2006.01)
*G01N 1/28* (2006.01)
(Continued)

(52) U.S. Cl.
CPC ............. *G01N 1/2813* (2013.01); *G01N 1/30* (2013.01); *G01N 35/04* (2013.01); *G01N 2035/00049* (2013.01)

(58) Field of Classification Search
None
See application file for complete search history.

(56) References Cited

U.S. PATENT DOCUMENTS 4,992,365 A 2/1991 Hyman
2014/0127745 A1 5/2014 Gonzaga et al.
(Continued)

FOREIGN PATENT DOCUMENTS

CN 201225970 Y 4/2009
CN 201255707 Y 6/2009
(Continued)

OTHER PUBLICATIONS

Yikui Li, One of the experimental methods for activating blood circulation and removing blood stasis—a blood rheology experiment, Experimental Methodology of Chinese Medicine Pharmacology, 1991, p. 67, Shanghai Science and Technology Press.
(Continued)

*Primary Examiner* — Jyoti Nagpaul
(74) *Attorney, Agent, or Firm* — Bayramoglu Law Offices LLC

(57) ABSTRACT

A full-automatic preparation method of a cast-off cell smear includes the following steps: S1: pretreatment of a cast-off cell: automatically pretreating the cast-off cell to be prepared to remove interfering substances; S2: automatically transferring a pretreated cast-off cell to a cyclic settling module to allow constant-temperature settling, and staining and moisturizing the pretreated cast-off cell; and S3: subjecting a moisturized cast-off cell to automatic liquid sealing. The full-automatic preparation method of the cast-off cell smear
(Continued)

realizes the automation of smear preparation, staining, and sealing, and also realizes the unattended high-throughput output and the high-quality smear preparation and sealing.

9 Claims, 2 Drawing Sheets

(51) Int. Cl.
| | |
|---|---|
| *G01N 1/30* | (2006.01) |
| *G01N 35/04* | (2006.01) |
| *G01N 35/00* | (2006.01) |

(56) References Cited

U.S. PATENT DOCUMENTS

| | | | |
|---|---|---|---|
| 2014/0207103 A1* | 7/2014 | Wolters | A61M 1/79 |
| | | | 604/506 |
| 2014/0273188 A1 | 9/2014 | Mohan et al. | |
| 2016/0251628 A1 | 9/2016 | Vincent et al. | |

FOREIGN PATENT DOCUMENTS

| | | |
|---|---|---|
| CN | 101957279 A | 1/2011 |
| CN | 201788111 U | 4/2011 |
| CN | 102042924 A | 5/2011 |
| CN | 102732094 A | 10/2012 |
| CN | 102759474 A | 10/2012 |
| CN | 106018033 A | 10/2016 |
| CN | 206974785 U | 2/2018 |
| CN | 108535068 A | 9/2018 |
| CN | 110398401 A | 11/2019 |
| CN | 110940568 A | 3/2020 |
| CN | 111057446 A | 4/2020 |
| CN | 111060368 A | 4/2020 |
| CN | 111175099 A | 5/2020 |
| CN | 112113817 A | 12/2020 |
| JP | 2002519666 A | 7/2002 |
| JP | 2013515235 A | 5/2013 |
| KR | 20200029111 A | 3/2020 |
| WO | 2018020897 A1 | 2/2018 |

OTHER PUBLICATIONS

M. Grasselli et al. Making porous membranes by chemical etching of heavy-ion tracks in β-PVDF films, Nuclear Instruments and Methods in Physics Research B, 2005, pp. 501-507, vol. 236 No. 1-4.

* cited by examiner

FULL-AUTOMATIC PREPARATION METHOD OF CAST-OFF CELL SMEAR

CROSS REFERENCE TO THE RELATED APPLICATIONS

This application is the national phase entry of International Application No. PCT/CN2021/088915, filed on Apr. 22, 2021, which is based upon and claims priority to Chinese Patent Application No. 202011074112.3, filed on Oct. 9, 2020, the entire contents of which are incorporated herein by reference.

TECHNICAL FIELD

The present invention belongs to the technical field of instruments for pathological cells, diagnostics and pathological biomolecule diagnostics, specifically relates to a preparation method of a cell smear, and in particular to a full-automatic preparation method of a cast-off cell smear.

BACKGROUND

In the medical testing and biological research, it is often necessary to perform smear preparation and staining on cell samples for convenient observation. The traditional smear preparation and staining process is carried out by hand, but the accuracy of the diagnosis is affected by a large number of cell accumulation and interference factors such as red blood cells, mucus, impurities and the like in the handmade cell smear, resulting in a false negative rate of 2% to 50%. In addition, the operator is likely to suffer eyestrain because the traditional preparation and staining process is time-consuming, laborious, and low-efficiency. In recent years, the application of liquid-based cytology technology has made a new breakthrough in the cell smear preparation and staining technology. In the liquid-based cytology technology, exfoliated cells are stored in a cell storage solution, which can effectively exclude interference factors such as red blood cells, mucus, impurities, and so on. Further, the liquid-based cytology technology can disperse and dissociate cell clusters to significantly improve the smear quality of pathological cytology, so that the cell structure and background are clear to facilitate diagnosis and significantly reduce the false negative rate.

By searching literature and patents, in the patents and literature related to cell smear preparation, the Chinese patent with the publication number of CN106018033A and the publication date of Oct. 12, 2016, entitled "fully-automatic liquid-based thin-layer cell smear preparation and staining device" discloses a fully-automatic liquid-based thin-layer cell smear preparation and staining device. In the technical solution disclosed by this patent, the device can automatically realize the operation of sample placement, pipetting, smear preparation and staining. Although the device can prepare the smear automatically to some extent and replace a part of manual operations, the smear preparation and staining device will lead to different extents of staining under different temperatures without effective quality control. Moreover, the device can only realize sample placement and staining rather than the full automation of cleaning, glass slide receiving and other processes, so it still needs manual operations, thus increasing the labor cost and smear preparation time, which is not conducive to reducing the cost of the whole process.

SUMMARY

In view of the defects in the prior art, an objective of the present invention is to provide a full-automatic preparation method of a cast-off cell smear.

To achieve the above objective, the present invention provides a full-automatic preparation method of a cast-off cell smear, including the following steps:

S1: pretreatment of a cast-off cell: automatically pretreating the cast-off cell to be prepared to remove interfering substances;

S2: automatically transferring a pretreated cast-off cell obtained in S1 to a cyclic settling module to allow constant-temperature settling, and staining and moisturizing the pretreated cast-off cell; and S3: subjecting a moisturized cast-off cell obtained in S2 to automatic liquid sealing.

In the technical solution described in the present invention, the inventors of the present invention use the cyclic settling module in combination with the automatic sealing for the first time, such that the full-automatic cast-off cell smear preparation can be achieved in the present invention. In particular, an operation in the cyclic settling module in the present invention can be implemented together with smear production and staining, and the cyclic settling module can be recycled, rather than be disposable. Therefore, the present invention has excellent recycling performance.

In addition, in the technical solution of the present invention, the cyclic settling module has the following advantages: 1. The cyclic settling module may allow cells to settle in a specified area of a glass slide. 2. Cells can be subjected to Papanicolaou staining in the cyclic settling module. 3. After the staining is completed, cells can be moisturized in the cyclic settling module for later sealing.

Moreover, in the technical solution of the present invention, a glass slide can also be laser-labeled in the cyclic settling module to ensure the traceability of each sample, thereby avoiding wrong sample identification. In particular, in the existing techniques, a smear preparation technician needs to check samples one by one when receiving a test sheet and the samples and then manually attach labels to sample bottles and glass slides in a one-to-one correspondence manner. The above process is easy to cause false detection due to human negligence, and thus it usually takes a lot of time for verification. The present invention provides a solution of laser labeling on a glass slide, which directly solves the problem of false detection caused by human error. A quick response (QR) code preset in a sample cup body is scanned such that a central control computer connected to the cyclic settling module determines the information of a sample, then the central control computer rotates a turntable to make a corresponding glass slide rotate to a laser labeling machine, and the glass slide is laser-labeled to complete the information docking between the sample and the glass slide, thereby ensuring the traceability of the sample.

Furthermore, another feature of the cyclic settling module in the present invention is that a glass slide is automatically loaded and pushed into a respective station, and can be automatically pushed into a sealing chamber after the staining and moisturizing steps.

Moreover, unlike the fact that sealing needs to be conducted manually in the prior art, the method of the present invention can be used to achieve automatic sealing in cooperation with a device. The full-automatic preparation method of a cast-off cell smear described in the present invention can continuously achieve cell settling and staining in an unattended case. In order to connect functions of high-throughput cell smear production of the module, the inventors of the present invention creatively adopt a liquid sealing technique to connect S3 and S2, thereby realizing automatic production, which excellently improves the productivity, realizes the unattended high-throughput output, and leads to a cell smear sample with high quality and excellent effect.

In summary, it can be seen that the full-automatic preparation method of a cast-off cell smear described in the present invention realizes the automation of smear preparation, staining, and sealing, and also realizes the unattended high-throughput output and the high-quality smear preparation and sealing.

Preferably, in S1, the pretreatment of the cast-off cell includes:

S11: using a cell cleaning chamber to clean and filter the cast-off cell, where a bottom of the cell cleaning chamber includes a filter membrane with a through-hole diameter of 5 μm to 20 μm and a uniform through-hole size; and the filter membrane selectively allows RBCs, white blood cells (WBCs), lymphocytes, and a cell storage solution to flow through the filter membrane while intercepting squamous epithelial cells and glandular cells on a surface of the filter membrane; and S12: using a first buffer to rinse the filter membrane with the squamous epithelial cells and the glandular cells intercepted to obtain a suspension of the squamous epithelial cells and the glandular cells.

In the full-automatic preparation method of a cast-off cell smear described in the present invention, the cast-off cells intercepted on the surface of the filter membrane can be resuspended in the first buffer, which is attributed to hydrophilicity of the surface of the membrane and characteristics of the first buffer.

In the full-automatic preparation method of a cast-off cell smear described in the present invention, the filter membrane may be prepared by allowing a heavy ion beam to penetrate through a polymer membrane, and the polymer membrane may be, for example, polyethylene (PE), polycarbonate (PC), polyethylene terephthalate (PET), polypropylene (PP), or polyimide (PI). During the preparation of the filter membrane, the heavy ion beam causes a radiation damage along a penetration path on the polymer membrane to leave corresponding traces, and then these traces are chemically etched to form through holes, where a time of the chemical etching can be controlled to allow a through-hole diameter of 5 μm to 20 μm and a uniform through-hole size, such that a filter membrane obtained has advantages such as stable properties, strong structure, low adsorption, and no shedding, and can intercept 100% of particles with a size larger than the pore size. Therefore, the filter membrane selectively allows RBCs, WBCs, lymphocytes, and a cell storage solution to flow through the filter membrane while intercepting squamous epithelial cells and glandular cells on a surface of the filter membrane.

Preferably, in S11, the filtration is achieved through positive pressure filtration with a pressure of 50 Pa to 1,000 Pa.

In the above solution, unlike the fact that positive pressure filtration is adopted in the prior art, positive pressure filtration is adopted in the present invention, which can make a mechanical structure simple and eliminate the risk of cross-contamination of a cell sample.

Preferably, in S12, the first buffer includes a pH buffer, a surfactant, a mucus lysis agent, and a protein protectant, for example, 1,000 mL of the first buffer includes: 0.5 g to 2 g of Tris, 2 g to 10 g of Tween-20, 0.1 g to 0.5 g of dithiothreitol (DTT), 0.5 g to 5 g of glycine, 0.2 g to 0.5 g of citric acid, and the balance of water; and a pH of the first buffer is adjusted to 7.5 to 8.

In the present invention, the first buffer preferably prepared from the above components plays an excellent improvement role for a cleaning effect. If the first buffer is not prepared from the components described in the present invention or a conventional buffer is adopted, it will not be conducive to the effective removal of impurities such as RBCs and WBCs. In addition, if the first buffer is not prepared from the components described in the present invention, a prepared cell morphology will also be affected, thereby affecting the determination of a result.

Preferably, in S11, the structure of the cell cleaning chamber is arranged on an inclined plane, and an included angle is formed between the inclined plane and a horizontal plane.

Preferably, the included angle is 5° to 30°.

In the above solution, the arrangement of the cell cleaning chamber on the inclined plane can improve the recovery efficiency of a cell suspension.

Preferably, in S2, the pretreated cast-off cell is transferred by a manipulator to the cyclic settling module.

Preferably, in S2, a constant temperature is controlled by a constant-temperature control system, and the constant-temperature control system includes a heating element and a temperature controller connected to the heating element; and the constant temperature is adjusted in a range of 25° C. to 45° C.

Given that a temperature has a great influence on staining during the reaction, the arrangement of the heating element and the constant-temperature control system can ensure that a sample is always kept at a constant temperature during staining, thereby ensuring the repeatability of staining. In particular, when the reaction temperature is lower than 25° C. or higher than 45° C., the inappropriate temperature will affect a number of settled cells such that there will be insufficient settled cells; and the inappropriate temperature will affect an effect of Papanicolaou staining, and a too-low or too-high temperature will lead to too-light or too-deep staining, which affects the determination of a result.

It should be noted that, in the technical solution of the present invention, when the temperature reaches a preset constant temperature such as 30° C., the temperature in the cyclic settling module is controlled by the constant-temperature control system at the constant temperature, with a temperature accuracy error range within ±2° C.

Preferably, in S2, the moisturizing includes: adding 0.2 mL to 0.3 mL of a wetting agent, and removing the wetting agent after 3 s to 8 s to leave a wetting layer on a surface of a cell layer.

Preferably, in S3, the automatic liquid sealing is conducted with a novel polymer material liquid sealing agent, and the novel polymer material liquid sealing agent includes the following components in mass percentages:

50% to 80% of an ultraviolet light-emitting diode (UV-LED) light-cure acrylic resin, 5% to 40% of a light-cure acrylic monomer, 0.5% to 8% of a reactive amine acrylic resin, 2% to 8% of a photoinitiator, 0.05% to 0.5% of a leveling agent, and 0.1% to 0.5% of a wetting agent.

In the above solution, the wetting agent used in S2 and S3 is an acrylate-containing solution, for example, an acrylate is one or a combination of two or more selected from the group consisting of trimethylolpropane triacrylate, tripropylene glycol diacrylate, and hexanediol diacrylate.

It should be noted that the traditional sealing is achieved by dropping a neutral resin (including a xylene solvent, which is a carcinogen) on a surface of a cell smear, and due to xylene, the cell smear needs to undergo ventilation in a fume hood for several hours before the cell smear can be used for identification. However, it should be noted that, in the technical solution of the present invention, a xylene-free novel polymer material is used for liquid sealing in the present invention. The novel polymer material will be rapidly cured after being sprayed on a surface of a cell layer and then irradiated with ultraviolet (UV) light, and a resulting cured layer is completely transparent, which can well reveal the prepared cell morphology. In addition, the polymer material is harmless to the human body, and a curing process of the polymer material only takes a few seconds.

Compared with the prior art, the present invention has the following advantages and beneficial effects:

1. The inventors of the present invention use the cyclic settling module in combination with the automatic sealing for the first time, such that the full-automatic cast-off cell smear preparation can be achieved in the present invention. In particular, an operation in the cyclic settling module in the present invention can be implemented together with smear production and staining, and the cyclic settling module can be recycled, rather than be disposable. Therefore, the present invention has excellent recycling performance.

2. The full-automatic preparation method of a cast-off cell smear described in the present invention realizes the automation of smear preparation, staining, and sealing, and also realizes the unattended high-throughput output and the high-quality smear preparation and sealing.

3. A xylene-free novel polymer material is used for liquid sealing in the present invention. The novel polymer material will be rapidly cured after being sprayed on a surface of a cell layer and then irradiated with UV light, and a resulting cured layer is completely transparent, which can well reveal the prepared cell morphology. In addition, the polymer material is harmless to the human body, and a curing process of the polymer material only takes a few seconds.

BRIEF DESCRIPTION OF THE DRAWINGS

By reading the detailed description of the non-restrictive embodiments with reference to the following drawings, other features, objectives, and advantages of the present invention will become more apparent.

Figure 1:
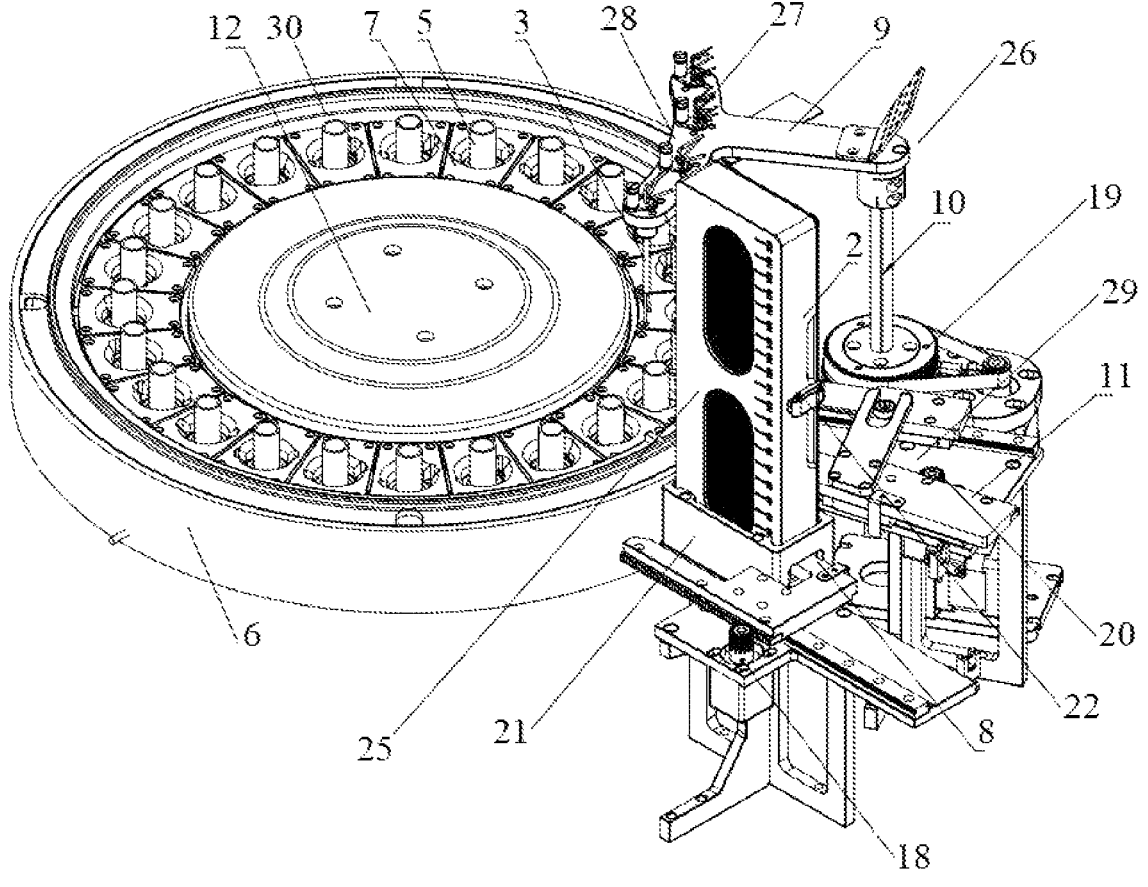
FIG. 1 schematically shows a cyclic settling module used by the full-automatic preparation method of a cast-off cell smear of the present invention in an embodiment.

Reference numerals in the accompanying drawings:

1-sealing device
2-glass slide case
3-UV lamp
4-curing cup
5-settling cup
6-thermal insulation housing
7-lifting mechanism
8-glass slide feeding fork
9-transverse reagent arm R shaft
10-reagent arm Z shaft
11-cleaning board pushing mechanism -continued 12-settling disc
13-curing box
14-adhesive addition arm
15-adhesive addition arm control mechanism
16-adhesive addition pipette
17-adhesive addition cleaning tank
18-frame
19-lifting drive motor
20-cleaning board motor
21-glass slide case clamping slot
22-glass slide case clasp
23-fork
24-sample sliding rail
25-glass slide storage and pushing mechanism
26-pipetting mechanism
27-reagent pipette assembly
28-arc bracket
29-cleaning assembly
30-settling smear preparation assembly

DETAILED DESCRIPTION OF THE EMBODIMENTS

The present invention is described in detail below in conjunction with embodiments. The following embodiments are helpful for those skilled in the art to further understand the present invention but do not limit the present invention in any form. It should be pointed out that for those having ordinary skill in the art, some changes and improvements may be made without departing from the idea of the present invention, and these changes and improvements shall fall within the scope of protection of the present invention.

Embodiment 1

FIG. 1 schematically shows a cyclic settling module used by the full-automatic preparation method of a cast-off cell smear of the present invention in an embodiment.

As shown in FIG. 1, the device for preparing a cast-off cell smear of the present invention includes a cyclic settling module, a heating temperature control system, and an UV sealing device. The cyclic settling module includes: rotary settling disc 12, glass slide storage and pushing mechanism 25, a sample addition pipette, pipetting mechanism 26, and cleaning assembly 29. The settling disc 12 includes a constant-temperature turntable provided with a plurality of spaced glass slide clamping slots 23 along an outer circumference, a thermal insulation housing, and a settling smear preparation assembly 30. The glass slide storage and pushing mechanism 25 includes glass slide case 2, glass slide feeding fork 8, and a glass slide discharging fork. The pipetting mechanism 26 includes reagent arm Z shaft 10, transverse reagent arm R shaft 9, and reagent pipette assembly 27 located at an end of the transverse reagent arm R shaft 9. The reagent pipette assembly 27 forms an arc and is located directly above the settling cup 5.

It should be noted that a constant-temperature control system is integrated inside the rotary settling disc 12 to control a temperature in the rotary settling disc, such that the temperature in the rotary settling disc 12 is always kept at 25° C. to 45° C. The constant-temperature control system includes a heating element and a temperature controller connected to the heating element. When the temperature controller detects that the temperature in the rotary settling disc is lower than 25° C., the heating element is controlled to heat the rotary settling disc; and when the temperature controller detects that the temperature in the rotary settling disc is higher than 45° C., the heating element is controlled to stop heating. In addition, an outer layer of the rotary settling disc 12 is provided with a thermal insulation housing, and the thermal insulation housing is made from a thermal insulation material and wraps a periphery and a lower part of the rotary settling disc 12 to keep the temperature in the rotary settling disc 12 stable, which provides a stable external environment for a staining reaction and avoids a sudden temperature change to affect a quality of a cell smear. The settling smear preparation assembly 30 includes a glass slide clamping slot, lifting mechanism 7, and settling cup 5, and the lifting mechanism 7 controls the settling cup 5 to move up and down along a central axis of the constant-temperature turntable. The lifting mechanism 7 controls the settling cup 5 to rise, fork motor 18 drives glass slide feeding fork 8 to push a glass slide in the glass slide case 2 into glass slide clamping slot 23 through glass slide inlet 24, and then the lifting mechanism 7 controls the settling cup 5 to lower down, such that a bottom of the settling cup 5 is tightly engaged with the glass slide. The reagent pipette assembly 27 includes vertically arranged arc bracket 28, an integrated reagent pipette, and an integrated cleaning pipette, where the integrated reagent pipette and the integrated cleaning pipette each are connected to an external container through an internal suction tube. The lifting drive motor 19 drives the reagent arm Z shaft 10 to move up and down to complete the addition of a reagent and the extraction of a waste liquid. The cleaning assembly 29 includes a cleaning board and cleaning board pushing mechanism 11. After the constant-temperature turntable completes Papanicolaou staining or settling cup cleaning once, the constant-temperature turntable rotates at least once to transfer the next settling cup 5 to be operated to a low below the reagent pipette assembly 27. The integrated reagent pipette works in cooperation with the integrated cleaning pipette to clean a settling cup to be cleaned while subjecting a sample in another settling cup to Papanicolaou staining.

It can be further seen from FIG. 1 that the glass slide case 2 is loaded with glass slides, snapped by the glass slide case clasp 22, and then inserted into the glass slide case clamping slot 21, thereby completing fixation. The lifting mechanism 7 controls the settling cup 5 to rise, the glass slide feeding fork 8 pushes a glass slide out, and the rotary settling disc 12 rotates to make the glass slide enter a corresponding glass slide clamping slot through the glass slide inlet. The lifting mechanism 7 makes the settling cup 5 to lower down, such that a bottom of the settling cup 5 is hermetically attached to the glass slide. A sample is injected by the sample addition pipette into the settling cup 5, the constant-temperature turntable makes the settling cup rotate to a position below the integrated reagent pipette, and the lifting drive motor 19 drives the reagent arm Z shaft 10 to lower down, thereby allowing Papanicolaou staining. After the Papanicolaou staining is completed, the glass slide clamping slot rotates to a discharging position, the glass slide discharging fork lowers down first, the glass slide enters the constant-temperature turntable through a glass slide outlet, the glass slide discharging fork rises to a position below the glass slide, the glass slide discharging fork exits, and the glass slide is pulled out. The glass slide clamping slot rotates to a cleaning position, the lifting mechanism controls the settling cup to rise, and the cleaning board motor 20 drives the cleaning board pushing mechanism 11 to push the cleaning board into the glass slide clamping slot through a cleaning board inlet; the lifting mechanism controls the settling cup 5 to lower down, the bottom of the settling cup 5 is hermetically attached to the cleaning board 31 to form a sealed structure, and the integrated cleaning pipette leads the cleaning reagent into the settling cup 5; after the cleaning is completed, the integrated cleaning pipette extracts a waste liquid; and the lifting mechanism 7 controls the settling cup 5 to rise, the cleaning board motor 20 drives the cleaning board pushing mechanism to pull the cleaning board out, and the lifting mechanism controls the settling cup to lower down.

Figure 2:
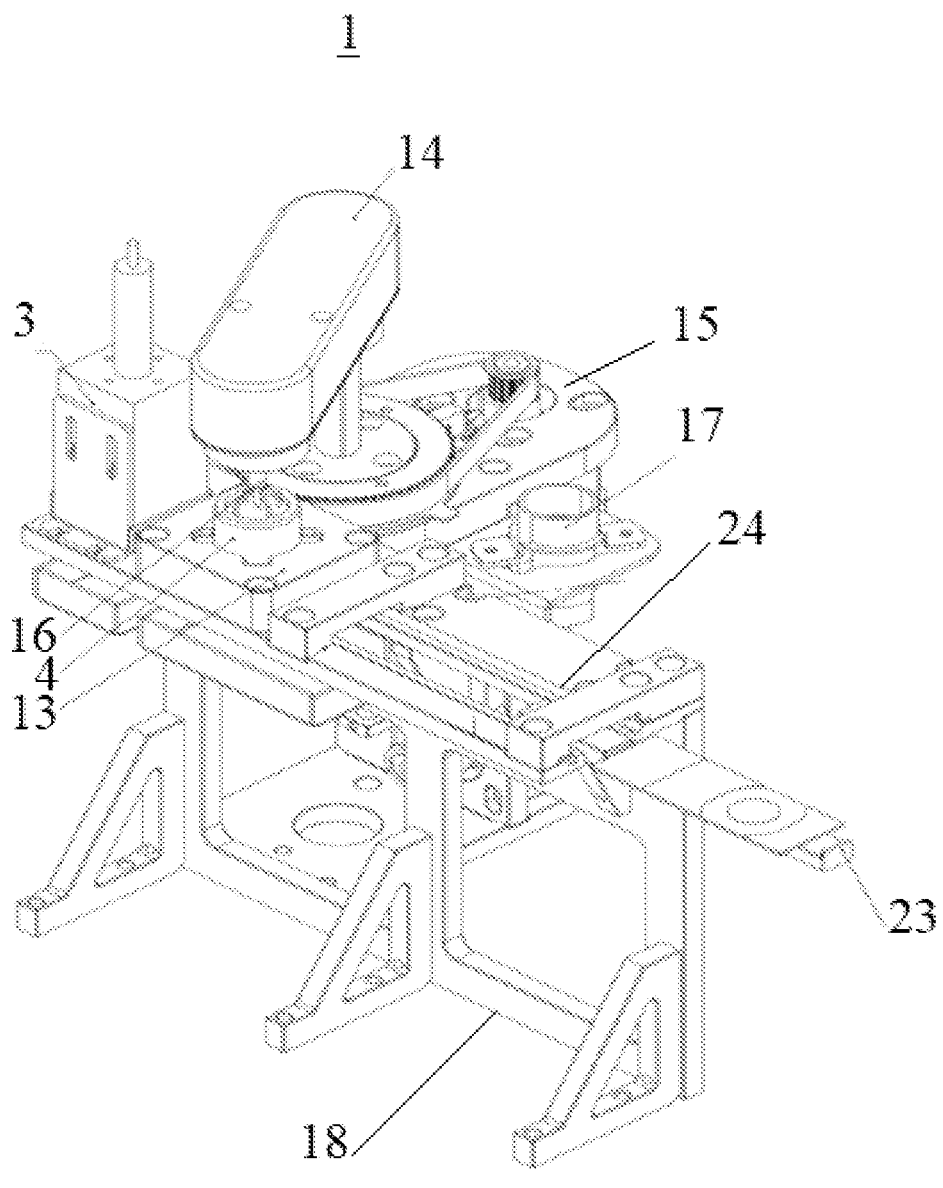
FIG. 2 schematically shows a UV sealing device used by the full-automatic preparation method of a cast-off cell smear of the present invention in an embodiment.

FIG. 2 schematically shows a UV sealing device used by the full-automatic preparation method of a cast-off cell smear of the present invention in an embodiment.

As shown in FIG. 2, the UV sealing device includes frame 18 and fork 23, adhesive addition arm 14, adhesive addition pipette 16, curing cup 4, curing box 13, UV lamp 3, adhesive addition cleaning tank 17, adhesive addition arm control mechanism 15, and sample sliding rail 24 that are arranged on the frame 18. The fork 23 is arranged at an end of the sample sliding rail 24, and can slide within the sample sliding rail 24. The curing box 13 and the UV lamp 3 are arranged above the sample sliding rail 24 from one side provided with the fork 23 to the other side, the curing cup 4 is arranged on the curing box 13, the adhesive addition arm 14 is arranged above the curing cup 4, and the adhesive addition pipette 16 is arranged on the adhesive addition arm 14. The adhesive addition arm control mechanism 15 controls the adhesive addition arm 14 to move in a vertical direction and a horizontal direction. For example, the adhesive addition arm control mechanism 15 is connected to the adhesive addition arm 14 through a gear or belt transmission mechanism, and can drive the adhesive addition arm 14 to rotate in a horizontal direction; or the adhesive addition arm control mechanism is connected to the adhesive addition arm 14 through a gear-rack mechanism or a gear-worm mechanism, and can drive the adhesive addition arm 14 to move up and down in a vertical direction.

It can be further seen from FIG. 2 that a lamp cover is provided outside the UV lamp 3, the lamp cover is located above the sample sliding rail, and a sample glass slide with an adhesive is cured under the UV lamp inside the lamp cover.

It should be noted that a structure of the adhesive addition arm 14 is provided with a novel polymer material liquid sealing adhesive receiving device, an injection system, a suction system, and a waste adhesive receiving device, where the adhesive addition pipette 16 includes a adhesive addition pipette and a adhesive suction pipette; the novel polymer material liquid sealing adhesive receiving device is connected to the injection system; the injection system is connected to the adhesive addition pipette; the adhesive suction pipette is connected to the suction system; and the suction system is connected to the waste adhesive receiving device.

It may be conceived that, in some other embodiments, one or more adhesive suction pipettes are provided, and when there are a plurality of adhesive suction pipettes, the plurality of adhesive suction pipettes are uniformly arranged along a circumference of the adhesive addition pipette; and the injection system is provided with a measurement device.

The injection system can add a new polymer material liquid sealing adhesive in the novel polymer material liquid sealing adhesive receiving device dropwise to a surface of a sample glass slide through the adhesive addition pipette. The volume of the adhesive injected by the injection system is measured by the measurement device, and the volume of the adhesive dripped is controlled by the measurement device. The suction system can suck the excess new polymer material liquid sealing adhesive to the waste adhesive receiving device through the adhesive suction pipette.

It can be further seen from FIG. 2 that the adhesive addition cleaning tank 17 is arranged on the frame 18 and is located on a movement path of the adhesive addition arm 14. The adhesive addition pipette 16 on the adhesive addition arm 14 is cleaned by the adhesive addition cleaning tank 17 after adhesive addition and suction.

Sealing is conducted with the sealing device 1. 50 µL to 500 µL of the adhesive is added dropwise, and the UV lamp 6 has a wavelength of 200 nm to 400 nm. Standing is conducted for 3 s to 10 s, and then adhesive suction is conducted by the adhesive addition pipette 16 for 5 s to 20 s to remove the excess new polymer material liquid sealing adhesive, such that a liquid thin layer is formed on a surface of the sample layer, and the liquid thin layer wraps an internal moisturizer and has a thickness of 0.02 mm to 0.08 mm.

With reference to FIG. 1 and FIG. 2, the full-automatic preparation method of a cast-off cell smear in the present invention is further explained, including the following steps:

S1: pretreatment of a cast-off cell: the cast-off cell to be prepared was automatically pretreated to remove interfering substances;

S2: a pretreated cast-off cell obtained in S1 was automatically transferred to a cyclic settling module to allow constant-temperature settling, and then stained and moisturized; and S3: a moisturized cast-off cell obtained in S2 was subjected to automatic liquid sealing.

A structure of the cyclic settling module in this embodiment may refer to Embodiment 1, and the automatic liquid sealing device in S3 may refer to the sealing device in Embodiment 1.

It should be noted that, in this embodiment, a glass slide can also be laser-labeled in the cyclic settling module to ensure the traceability of each sample, thereby avoiding wrong sample identification. In particular, in the existing techniques, a smear preparation technician needs to check samples one by one when receiving a test sheet and the samples and then manually attach labels to sample bottles and glass slides in a one-to-one correspondence manner. The above process is easy to cause false detection due to human negligence, and thus it usually takes a lot of time for verification. This embodiment provides a solution of laser labeling on a glass slide, which directly solves the problem of false detection caused by human error. A QR code preset in a sample cup body is scanned such that a central control computer connected to the cyclic settling module determines the information of a sample, then the central control computer rotates a turntable to make a corresponding glass slide rotate to a laser labeling machine, and the glass slide is laser-labeled to complete the information docking between the sample and the glass slide, thereby ensuring the traceability of the sample.

Embodiment 2

A full-automatic preparation method of a cast-off cell smear is provided in this embodiment, and a device used by the method may refer to Embodiment 1. The method in this embodiment is different from the method in Embodiment 1 in that, in S1, the pretreatment of the cast-off cell includes:

S11: a cell cleaning chamber was used to clean and filter the cast-off cell, where a bottom of the cell cleaning chamber included a filter membrane with a through-hole diameter of 5 µm to 20 µm and a uniform through-hole size; and the filter membrane selectively allowed RBCs, WBCs, lymphocytes, and a cell storage solution to flow through the filter membrane while intercepting squamous epithelial cells and glandular cells on a surface of the filter membrane; and S12: a first buffer was used to rinse the filter membrane with the squamous epithelial cells and the glandular cells intercepted to obtain a suspension of the squamous epithelial cells and the glandular cells.

It should be noted that the cast-off cells intercepted on the surface of the filter membrane can be resuspended in the first buffer, which is attributed to hydrophilicity of the surface of the membrane and characteristics of the first buffer.

In this embodiment, the filter membrane may be prepared by allowing a heavy ion beam to penetrate through a polymer membrane, and the polymer membrane may be, for example, PE, PC, PET, PP, or PI. During the preparation of the filter membrane, the heavy ion beam causes a radiation damage along a penetration path on the polymer membrane to leave corresponding traces, and then these traces are chemically etched to form through holes, where a time of the chemical etching can be controlled to allow a through-hole diameter of 5 µm to 20 µm and a uniform through-hole size, such that a filter membrane obtained has advantages such as stable properties, strong structure, low adsorption, and no shedding, and can intercept 100% of particles with a size larger than the pore size. Therefore, the filter membrane selectively allows RBCs, WBCs, lymphocytes, and a cell storage solution to flow through the filter membrane while intercepting squamous epithelial cells and glandular cells on a surface of the filter membrane.

In addition, in some preferred embodiments, in S11, the filtration is achieved through positive pressure filtration with a pressure of 50 Pa to 1,000 Pa.

In the above solution, unlike the fact that positive pressure filtration is adopted in the prior art, positive pressure filtration is adopted in the present invention, which can make a mechanical structure simple and eliminate the risk of cross-contamination of a cell sample.

In addition, in S12, the first buffer includes a pH buffer, a surfactant, a mucus lysis agent, and a protein protectant, for example, 1,000 mL of the first buffer includes: 0.5 g to 2 g of Tris, 2 g to 10 g of Tween-20, 0.1 g to 0.5 g of DTT, 0.5 g to 5 g of glycine, 0.2 g to 0.5 g of citric acid, and the balance of water; and a pH of the first buffer is adjusted to 7.5 to 8.

In some other embodiments, in order to improve the recovery efficiency of a cell suspension, a cell cleaning chamber may be arranged on an inclined plane, that is, the structure of the cell cleaning chamber is arranged on the inclined plane, and an included angle of 5° to 30° is formed between the inclined plane and a horizontal plane.

In some other embodiments, in S2, the moisturizing includes: 0.2 mL to 0.3 mL of a wetting agent was added, and the wetting agent was removed after 3 s to 8 s to leave a wetting layer on a surface of a cell layer.

Embodiments 3 to 6

A full-automatic preparation method of a cast-off cell smear is provided in this embodiment, and a device used by the method may refer to Embodiment 1. The method in this embodiment is different from the method in Embodiment 1 in that, a composition of the first buffer is different, which is shown in Table 1:

TABLE 1

| | Tris | Tween-20 | DTT | Glycine | Citric acid | pH of the first buffer |
|---|---|---|---|---|---|---|
| (wt %, the balance is water) | | | | | | |
| Embodiment 3 | 0.05 | 1 | 0.05 | 0.5 | 0.02 | 7.6 |
| Embodiment 4 | 0.12 | 0.4 | 0.03 | 0.24 | 0.03 | 7.6 |
| Embodiment 5 | 0.15 | 0.6 | 0.04 | 0.15 | 0.35 | 7.8 |
| Embodiment 6 | 0.2 | 0.2 | 0.01 | 0.05 | 0.05 | 7.9 |

When the components of the first buffer are not as follows: Tris: 0.5 g to 2 g, Tween-20: 2 g to 10 g, DTT: 0.1 g to 0.5 g, glycine: 0.5 g to 5 g, citric acid: 0.2 g to 0.5 g, and water: the balance, and when the pH of the first buffer is adjusted to 7.5 to 8, it will cause the imbalance of the first buffer, the cleaning effect will also be affected, and excessive impurities will affect the adsorption of a glass slide, such that a number of adsorbed cells is lower than a standard value, resulting in an unqualified smear.

Embodiments 7 to 10

A full-automatic preparation method of a cast-off cell smear is provided in this embodiment, and a device used by the method may refer to Embodiment 1. The method in this embodiment is different from the method in Embodiment 1 in that, a composition of the polymer material liquid sealing adhesive is different, which is shown in Table 2:

TABLE 2

| | UV-LED light-cure acrylic resin | Light-cure acrylic monomer | Reactive amine acrylic resin | Photoinitiator | Leveling agent | Wetting agent |
|---|---|---|---|---|---|---|
| (wt %) | | | | | | |
| Embodiment 7 | 50 | 41.35 | 0.5 | 8 | 0.05 | 0.1 |
| Embodiment 8 | 60 | 34 | 2.6 | 3 | 0.2 | 0.2 |
| Embodiment 9 | 70 | 20 | 7.3 | 2 | 0.4 | 0.3 |
| Embodiment 10 | 80 | 5 | 8 | 6 | 0.5 | 0.5 |

The above components can be purchased from Guangzhou WUX Material Science Co., Ltd. or Shanghai Bojue New Material Co., Ltd. The leveling agent may be one or a combination of two or more selected from the group consisting of a water-based leveling agent BYK 333, a TEGO410 leveling agent, and a TEGO300 leveling agent, and the wetting agent may be one or a combination of two or more selected from the group consisting of trimethylolpropane triacrylate, tripropylene glycol diacrylate, and hexanediol diacrylate.

It should be noted that the prior art part in the scope of protection of the present invention is not limited to the embodiments given in this application document, and all prior arts that do not contradict the solution of the present invention, including, but not limited to, prior patent documents, prior public publications, prior public use, etc., can be included in the scope of protection of the present invention.

In addition, the combination of the technical features in this application is not limited to the combination recorded in the claims or the combination recorded in the specific embodiments. All the technical features recorded in this application can be freely combined in any way unless there is a contradiction between each other.

It should also be noted that the embodiments listed above are only specific embodiments of the present invention. It is obvious that the present invention is not limited to the above embodiments, and the subsequent similar changes or deformations that can be directly derived or easily associated by those skilled in the art from the contents disclosed by the present invention shall fall within the scope of protection of the present invention.

Specific embodiments of the present invention are described above. It should be understood that the present invention is not limited to the above-mentioned specific embodiments and that those skilled in the art may make various changes or modifications within the scope of the claims, which does not affect the substance of the present invention. In case of no conflict, the embodiments as well as the features of embodiments of this application may be arbitrarily combined with each other.

What is claimed is:

1. A full-automatic preparation method of a cast-off cell smear, comprising the following steps:
   S1: pretreatment of a cast-off cell: automatically pretreating the cast-off cell to be prepared to remove interfering substances to obtain a pretreated cast-off cell;
   S2: automatically transferring the pretreated cast-off cell obtained in S1 to a cyclic settling module to allow constant-temperature settling, and staining and moisturizing the pretreated cast-off cell to obtain a moisturized cast-off cell; and
   S3: subjecting the moisturized cast-off cell obtained in S2 to automatic liquid sealing, wherein the automatic liquid sealing is conducted with a polymer material liquid sealing agent, and the polymer material liquid sealing agent comprises the following components in mass percentages:
   50% to 80% of an ultraviolet light-emitting diode (UV-LED) light-cure acrylic resin,
   5% to 40% of a light-cure acrylic monomer,
   0.5% to 8% of a reactive amine acrylic resin,
   2% to 8% of a photoinitiator,
   0.05% to 0.5% of a leveling agent, and
   0.1% to 0.5% of a wetting agent.

2. The full-automatic preparation method of the cast-off cell smear according to claim 1, wherein in S1, the pretreatment of the cast-off cell comprises:
   S11: using a cell cleaning chamber to clean and filter the cast-off cell, wherein a bottom of the cell cleaning chamber comprises a filter membrane with a through-hole diameter of 5 μm to 20 μm and a uniform through-hole size; and the filter membrane selectively allows red blood cells (RBCs), white blood cells (WBCs), lymphocytes, and a cell storage solution to flow through the filter membrane while intercepting squamous epithelial cells and glandular cells on a surface of the filter membrane; and
   S12: using a first buffer to rinse the filter membrane with the squamous epithelial cells and the glandular cells intercepted to obtain a suspension of the squamous epithelial cells and the glandular cells.

3. The full-automatic preparation method of the cast-off cell smear according to claim 2, wherein in S11, the filtration is achieved through positive pressure filtration with a pressure of 50 Pa to 1,000 Pa.

4. The full-automatic preparation method of the cast-off cell smear according to claim 2, wherein in S12, the first buffer comprises a pH buffer, a surfactant, a mucus lysis agent, and a protein protectant.

5. The full-automatic preparation method of the cast-off cell smear according to claim 2, wherein in S11, a structure of the cell cleaning chamber is arranged on an inclined plane, and an included angle is formed between the inclined plane and a horizontal plane.

6. The full-automatic preparation method of the cast-off cell smear according to claim 5, wherein the included angle is 5° to 30°.

7. The full-automatic preparation method of the cast-off cell smear according to claim 1, wherein in S2, the pre-treated cast-off cell is transferred by a manipulator to the cyclic settling module.

8. The full-automatic preparation method of the cast-off cell smear according to claim 1, wherein in S2, a constant temperature is controlled by a constant-temperature control system, and the constant-temperature control system comprises a heating element and a temperature controller connected to the heating element; and the constant temperature is adjusted in a range of 25° C. to 45° C.

9. The full-automatic preparation method of the cast-off cell smear according to claim 1, wherein in S2, the moisturizing comprises: adding 0.2 mL to 0.3 mL of a wetting agent, and removing the wetting agent after 3 s to 8 s to leave a wetting layer on a surface of a cell layer.

* * * * *